United States Patent
Keefer

(10) Patent No.: US 9,977,555 B2
(45) Date of Patent: May 22, 2018

(54) CAPACITIVE TOUCH SENSOR APPARATUS

(71) Applicant: 3M INNOVATIVE PROPERTIES COMPANY, St. Paul, MN (US)

(72) Inventor: Kenneth J. Keefer, Westford, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 15/324,388

(22) PCT Filed: Aug. 3, 2015

(86) PCT No.: PCT/US2015/043430
§ 371 (c)(1),
(2) Date: Jan. 6, 2017

(87) PCT Pub. No.: WO2016/025209
PCT Pub. Date: Feb. 18, 2016

(65) Prior Publication Data
US 2017/0199595 A1      Jul. 13, 2017

Related U.S. Application Data

(60) Provisional application No. 62/035,542, filed on Aug. 11, 2014.

(51) Int. Cl.
*G06F 3/045* (2006.01)
*G06F 3/044* (2006.01)

(52) U.S. Cl.
CPC .... *G06F 3/044* (2013.01); *G06F 2203/04111* (2013.01)

(58) Field of Classification Search
CPC ................ G06F 3/044; G06F 2203/04111
See application file for complete search history.

(56) References Cited

U.S. PATENT DOCUMENTS

| | | | |
|---|---|---|---|
| 8,599,161 B2 | 12/2013 | Philipp | |
| 2011/0102370 A1 | 5/2011 | Kono | |
| 2014/0118298 A1 | 5/2014 | Han | |
| 2014/0204290 A1 | 7/2014 | Chen | |
| 2015/0242028 A1* | 8/2015 | Roberts | ........... G06F 3/044 345/173 |

FOREIGN PATENT DOCUMENTS

WO    WO 2013-179042       12/2013

OTHER PUBLICATIONS

International Search Report for PCT International Application No. PCT/US2015/043430, dated Sep. 28, 2015, 4 pages.

\* cited by examiner

*Primary Examiner* — Adam R Giesy
(74) *Attorney, Agent, or Firm* — Robert S. Moshrefzadeh

(57) ABSTRACT

A capacitive touch sensor apparatus includes a viewing area and a border area. Electrical sensing nodes or electrodes are disposed in both the viewing area and the border area.

4 Claims, 3 Drawing Sheets

CAPACITIVE TOUCH SENSOR APPARATUS

BACKGROUND

Electronic displays are widely used. Although in the past the use of electronic displays has been primarily limited to computing applications such as desktop computers and notebook computers, as processing power has become more readily available, such capability has been integrated into a wide variety of applications. For example, it is now common to see electronic displays in applications such as teller machines, gaming machines, automotive navigation systems, restaurant management systems, grocery store checkout lines, gas pumps, information kiosks, and hand-held data organizers to name a few.

Interactive visual displays often include some form of touch sensitive screen. Integrating touch sensitive panels with visual displays is becoming more common with the emergence of portable multimedia devices. Capacitive touch sensing techniques for touch sensitive panels involve sensing a change in a signal due to capacitive coupling created by a touch on the touch panel. An electric field is applied to electrodes on the touch panel. A touch on the touch panel couples in a capacitance that alters the electric field in the vicinity of the touch. The change in the field is detected and used to determine the touch location.

SUMMARY

The present disclosure relates to a capacitive touch sensor apparatus that includes a viewing area and a border area. Electrical sensing nodes or electrodes are disposed in both the viewing area and the border area.

In one aspect, a capacitive touch sensitive apparatus includes a touch sensitive viewing area, and a border area surrounding the touch sensitive viewing area. A plurality of spaced apart electrically conductive first electrodes are disposed in the touch sensitive viewing area and extending along a first direction and a plurality of spaced apart electrically conductive second electrodes are disposed in the touch sensitive viewing area and extending along a different second direction. The capacitive touch sensitive apparatus includes a plurality of nodes. Each node is defined by corresponding first and second electrodes traversing each other at the node. Each first electrode traversing at least one second electrode and each second electrode traversing at least one first electrode. The touch sensitive apparatus is configured to detect a location of a touch applied proximate a node by detecting a change in a coupling capacitance between the corresponding first and second electrodes traversing each other at the node. A plurality of electrically conductive bus lines are disposed in the border area for electrically coupling the pluralities of the first and second electrodes to a controller. At least one node in the plurality of nodes is disposed in the border area.

In another aspect, a capacitive touch sensitive apparatus includes an optically transparent touch sensitive area and an optically opaque border area surrounding the touch sensitive area. A plurality of spaced apart electrically conductive optically transparent first electrodes are disposed in the touch sensitive area and extend along a first direction. A plurality of spaced apart electrically conductive optically transparent second electrodes are disposed in the touch sensitive area and extend along a different second direction. The touch sensitive apparatus is configured to detect a location of a touch applied in the touch sensitive area by detecting a change in a coupling capacitance between a first and a second electrode traversing each other near the touch location. A plurality of electrically conductive bus lines is disposed in the border area for electrically coupling the pluralities of the first and second electrodes to a controller. At least one of a first and second electrode is disposed in the border area.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
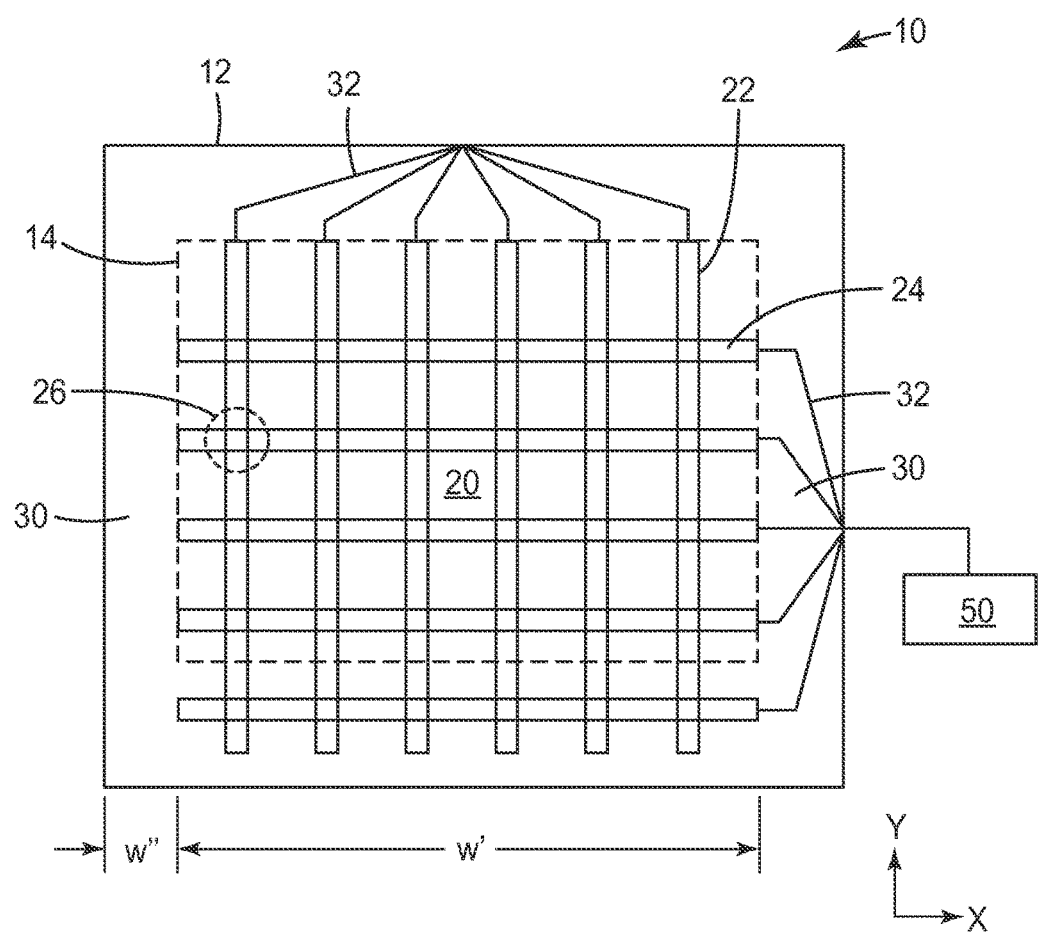
FIG. 1 is a schematic diagram of an illustrative capacitive touch sensor apparatus.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

In this disclosure:

"border area" refers to a non-viewing area portion of the capacitive touch sensor apparatus, The border area is often opaque and includes the bus lines for the capacitive touch sensor;

"optically transparent" refers to an optical density, or absorbance, of less than 1;

"optically opaque" refers to an optical density of at least 2, or at least 3.

The present disclosure relates to capacitive touch sensors apparatus includes a viewing area and a border area. Electrical sensing nodes or electrodes are disposed in both the viewing area and the border area. Placing one or more sensing nodes or first and second parallel electrodes in the border area can improve the performance of the capacitive touch sensors apparatus. Placing one or more sensing nodes or first and second parallel electrodes in the border area can improve the performance of the capacitive touch sensor apparatus. This performance improvement may be an improvement in the accuracy of detecting the location of an applied touch. The accuracy of detecting the location of an applied touch depends, for example, on the linearity or uniformity of the electric field in the viewing area. In at least one aspect, placing one or more sensing nodes or first and second parallel electrodes in the border area improves the linearity or uniformity of the electric field in the viewing area and, as a result, the accuracy of detecting the location of an applied touch. While the present disclosure is not so limited, an appreciation of various aspects of the disclosure will be gained through a discussion of the examples provided below.

FIG. 1 is a schematic diagram of an illustrative capacitive touch sensor apparatus 10. The capacitive touch sensitive apparatus 10 can include a touch sensitive area or viewing area 20 and a border area 30 surrounding the touch sensitive area or viewing area 20. In many embodiments the touch sensitive area 20 is optically transparent and the border area 30 is optically opaque. In many embodiments, the touch sensitive area 20 has a first maximum width W' and the border area 30 has a second maximum width W" that is smaller than the first maximum width W' by at least a factor of 10, or at least a factor of 100.

The border area 30 is optically opaque and has an optical density of at least 2, or at least 3. In many embodiments an optically opaque layer is disposed in the border area 30 and defines the border area 30, and preferably does overlap or enter the viewing area 20. The optically opaque layer can be formed by printing opaque material.

The capacitive touch sensor apparatus 10 can be flat or curved and conform to an associated and adjacent display panel to form a display system. The display system can include a display having a viewing area configured to display information and the capacitive touch sensitive apparatus 10 disposed on the display. The touch sensitive area 20 can be substantially aligned with the viewing area of the display.

A plurality of spaced apart electrically conductive first electrodes 22 are disposed in the touch sensitive area 20 and extend along a first direction (for example along the Y direction). The first electrodes 22 can be optically transparent. The first electrodes 22 can be formed of, or include optically transparent metal oxide such as at least one of indium tin oxide (ITO), zinc oxide (ZnO), aluminum zinc oxide (AZO), indium zinc oxide (IZO), and tin antimony oxide (TAO). In many embodiments, each first electrode 22 is a self-supporting electrically conductive wire surrounded by an insulative cladding coated on the conductive wire.

While six parallel extending first electrodes 22 are illustrated, it is understood that the capacitive touch sensor apparatus 10 can include any number of first electrodes 22. At least one of the first electrodes 22 extends into the border area 30. In many embodiments a plurality of all (as illustrated) of the first electrodes 22 extend into the border area 30.

A plurality of spaced apart electrically conductive second electrodes 24 are disposed in the touch sensitive area 20 and extending along a different second direction (that is, different than the first direction, for example along the X direction). In many embodiments the second electrodes 24 are orthogonal to the first electrodes 22. The second electrodes 24 can be optically transparent. The second electrodes 24 can be formed of, or include optically transparent metal oxide such as at least one of indium tin oxide (ITO), zinc oxide (ZnO), aluminum zinc oxide (AZO), indium zinc oxide (IZO), and tin antimony oxide (TAO). In many embodiments, each second electrode 24 is a self-supporting electrically conductive wire surrounded by an insulative cladding coated on the conductive wire.

While five parallel extending second electrodes 24 are illustrated, it is understood that the capacitive touch sensor apparatus 10 can include any number of second electrodes 24. At least one of the second electrodes 24 extends into the border area 30. In many embodiments a plurality of all of the second electrodes 24 extend into the border area 30. FIG. 1 illustrates one entire second electrode within the border area 30.

The capacitive touch sensitive apparatus 10 includes a plurality of nodes 26. Each node 26 is defined by corresponding first and second electrodes traversing each other at the node 26. Each first electrode 22 traverses at least one second electrode 24. Each second electrode 24 traverses at least one first electrode 22. The capacitive touch sensitive apparatus 10 is configured to detect a location of a touch applied proximate a node 26 by detecting a change in a coupling capacitance between the corresponding first and second electrodes 22, 24 traversing each other at the node 26.

At least one or a portion of one first or second electrode 22, 24 is disposed in the border area. In many embodiments, at least one or portion of one first electrodes 22 and at least one or portion of one second electrodes 24 are disposed in the border area 30. In many embodiments, at least one node 26 in the plurality of nodes is disposed in the border area 30. FIG. 1 illustrates six nodes 26 disposed within the border area 30 and twenty-four nodes 26 disposed within the viewing area 20. It is understood that the viewing area 20 can have 100 or more ,or 1000 or more nodes 26, and the border area can have any useful number of nodes 26 also, as desired A plurality of electrically conductive bus lines 32 is disposed in the border area 30 for electrically coupling the pluralities of the first and/or second electrodes 22, 24 to a controller 50. In many embodiments, each bus line 32 is a self-supporting electrically conductive wire surrounded by an insulative cladding coated on the conductive wire. In many embodiments, the first and second electrodes 22, 24 form a first group of electrodes and a remaining second group of electrodes and the bus lines 32 form a first group of bus lines and a remaining second group of bus lines and the first group of electrodes being routed by the first group of bus lines to a first outer edge 12 of the border area and the second group of electrodes being routed by the second group of bus lines to a different second outer edge 12 of the border area (as illustrated in FIG. 1). The first outer edge is opposite the second outer edge. In other embodiments, the first and second electrodes are routed by the bus lines to a same outer edge 12 of the border area 30.

The electrically conductive bus lines 32 can electrically connect all or a portion of the pluralities of the first and second electrodes 22, 24 to a controller 50. In some embodiments, the at least one first or second electrode 22, 24 that is disposed in the border area 30 is not electrically coupled or connected to the controller 50. In some embodiments, the at least one first and second electrode 22, 24 that are disposed in the border area 30 are not electrically coupled or connected to the controller 50. In some embodiments, at least one node 26 in the plurality of nodes that is disposed in the border area 30 corresponds to a first electrode 22 and a second electrode 24 traversing each other at the at least one node 26 and at least one of the first and second electrodes 22, 24 are not electrically connected to a bus line 32 disposed in the border area 30.

The first and second electrode 22, 24 can be disposed within the viewing area 20 in any useful manner. In some embodiments the first electrodes 22 are disposed on a first major surface of an optically transparent substrate disposed in the touch sensitive area 20 and the second electrodes 24 are disposed on an opposite second major surface of the optically transparent substrate in the touch sensitive area 20. In other embodiments the first electrodes 22 and the second electrodes 24 are disposed on a first major surface of an optically transparent substrate disposed in the touch sensitive area 20. In many embodiments each first and second electrode 22, 24 are self-supporting electrically conductive wire than can be surrounded by an insulative cladding coated on the conductive wire.

Figure 2:
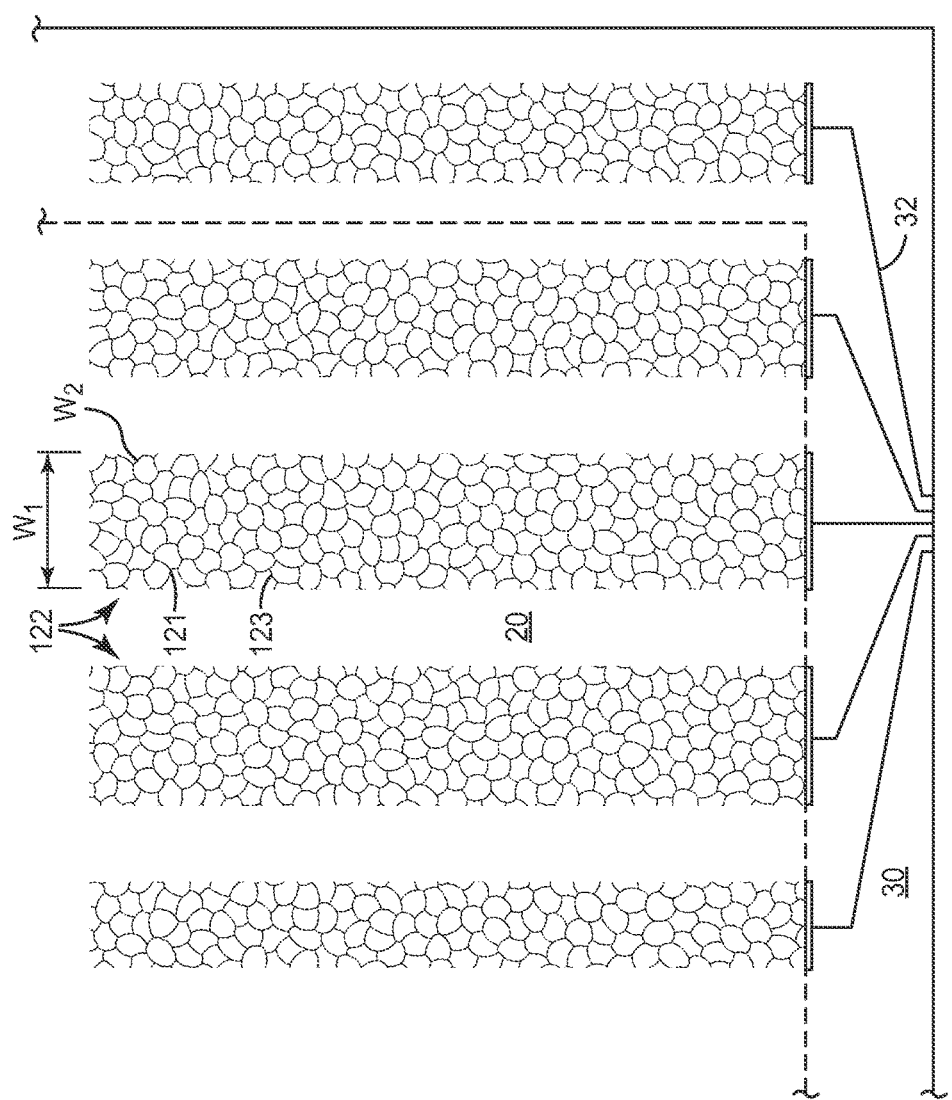
FIG. 2 is a schematic diagram of conductive mesh parallel first electrodes.
Figure 3:
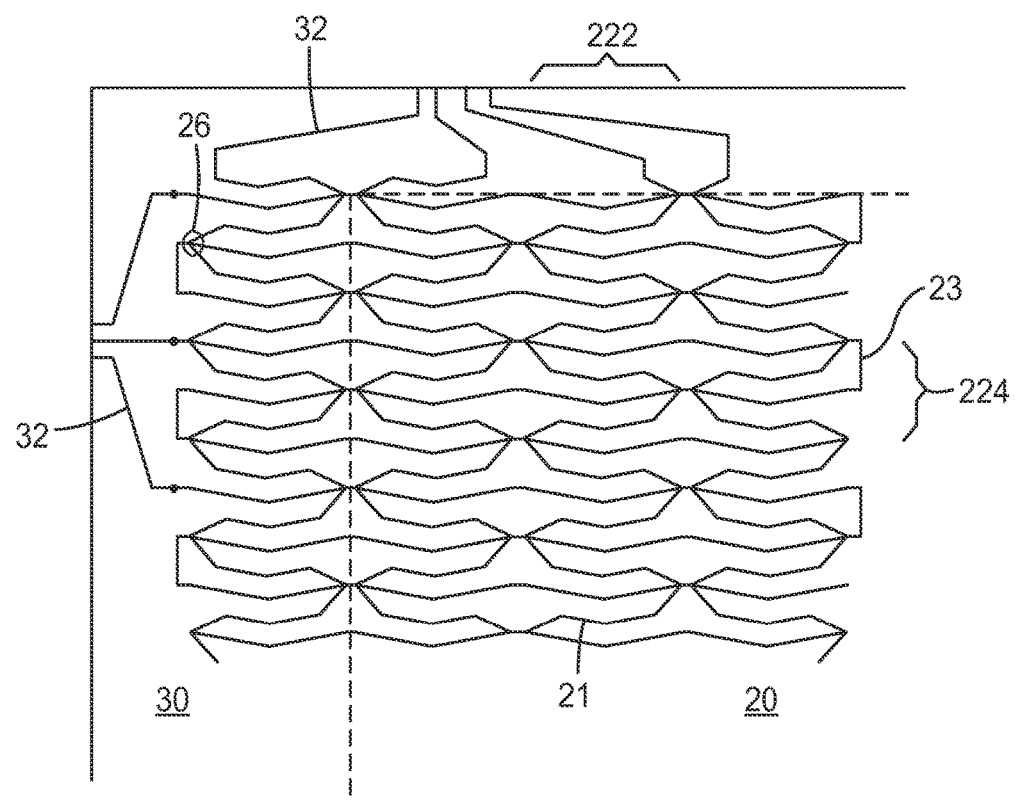
FIG. 3 is a schematic diagram of another embodiment of parallel zig-zag first and second electrodes.

FIG. 2 and FIG. 3 illustrate alternative electrode configurations. FIG. 2 is a schematic diagram of conductive mesh parallel first electrodes 122. FIG. 3 is a schematic diagram of another embodiment of parallel zig-zag first and second electrodes 222, 224.

FIG. 2 shows five parallel electrically conductive optically transparent mesh first electrodes 122 where one mesh first electrode 122 is disposed within the border area 30. Bus lines 32 connect each mesh first electrode 122 to electronics of the touch sensitive apparatus. Bus lines 32 are disposed within the border area 30 as described above. Each mesh first electrode 122 is defined by an electrically conductive optically transparent mesh including a plurality of vertices 121 connecting a plurality of electrically conductive edges 123. The second electrodes 24 (not shown in FIG. 2) can be configured similarly as parallel electrically conductive optically transparent mesh second electrodes. These mesh second electrodes can be configured as described above for the mesh first electrodes 122. Alternatively the second electrodes 24 can be configured according to FIG. 3 or FIG. 1, as desired.

The conductive edges 123 have a second maximum width $W_2$ and are optically opaque. In some embodiments the conductive edges 123 are linear or straight. In other embodiments the conductive edges 123 are curved or arcuate. In many embodiments each edge 123 in the plurality of electrically conductive edges 123 are formed of or include at least one of copper, silver, or gold. The conductive edges 123 each have a maximum width of less than 10 microns or less than 5 microns. In many embodiments, the conductive edges 123 each have a substantially constant width along an entire length of the edge 123. In other embodiments, the conductive edges 123 each have a varying width along a length of the edge 123.

Each mesh first electrodes 122 is defined by a length and a first maximum width $W_1$, and each edge in the plurality of electrically conductive edges has a second maximum width $W_2$ smaller than the first maximum width $W_1$ by at least a factor of 10 or at least a factor of 100.

Each mesh first electrodes 122 has an optical transmission that is greater than about 95%, or greater than about 98%. Each mesh first electrodes 122 has an open area fraction of at least 95%, or at least 98%.

FIG. 3 is a schematic diagram of another embodiment of parallel zig-zag electrodes 222, 224. This figure illustrates four parallel (vertical) first electrodes 222 arranged in a zig-zag configuration and three parallel (horizontal) second electrodes 224 arranged in a zig-zag configuration. This configuration is described generally in FIG. 1 except that the first and second electrodes 222, 224 are configured in a periodic pattern spanning the width of the parallel (vertical) first electrodes 222 and spanning the length of the parallel (horizontal) second electrodes 224. In many embodiments, each first electrode 222 is a self-supporting electrically conductive wire 21 surrounded by an insulative cladding coated on the conductive wire 21. In many embodiments, each second electrode 224 is a self-supporting electrically conductive wire 23 surrounded by an insulative cladding coated on the conductive wire 23.

A first electrode 222 is disposed in the border area 30 while the remaining first electrodes 222 are disposed in the viewing area 20. Bus lines 32 are located in the border area 30 and connect the first and second electrodes 222, 224 to the controller.

In many embodiments, each first and second electrode 222, 224 includes a plurality of substantially parallel electrically conductive electrode lines electrically connected to one another at opposite longitudinal ends of the first electrode 222. In other embodiments, each first 222, but not second 224, electrode includes a plurality of substantially parallel electrically conductive electrode lines electrically connected to one another at opposite longitudinal ends of the first electrode 222. In many embodiments each first and second electrodes traversing each other defines a plurality of nodes 26 since both first and second electrodes define a periodic pattern.

Each node 26 is defined by corresponding first and second electrodes traversing each other at the node 26.

Thus, embodiments of CAPACITIVE TOUCH SENSOR APPARATUS are disclosed.

Embodiment 1 is a capacitive touch sensitive apparatus, comprising: a touch sensitive viewing area; a border area surrounding the touch sensitive viewing area; a plurality of spaced apart electrically conductive first electrodes disposed in the touch sensitive viewing area and extending along a first direction; a plurality of spaced apart electrically conductive second electrodes disposed in the touch sensitive viewing area and extending along a different second direction; a plurality of nodes, each node defined by corresponding first and second electrodes traversing each other at the node, each first electrode traversing at least one second electrode, each second electrode traversing at least one first electrode, the touch sensitive apparatus being configured to detect a location of a touch applied proximate a node by detecting a change in a coupling capacitance between the corresponding first and second electrodes traversing each other at the node; and a plurality of electrically conductive bus lines disposed in the border area for electrically coupling the pluralities of the first and second electrodes to a controller, wherein at least one node in the plurality of nodes is disposed in the border area.

Embodiment 2 is the touch sensitive apparatus of embodiment 1, wherein the touch sensitive viewing area is optically transparent.

Embodiment 3 is the touch sensitive apparatus of embodiment 1, wherein the border area is optically opaque.

Embodiment 4 is the touch sensitive apparatus of embodiment 3 comprising an optically opaque layer disposed in the border, but not the touch sensitive viewing, area.

Embodiment 5 is the touch sensitive apparatus of embodiment 4, wherein the optically opaque layer is a printed optically opaque layer.

Embodiment 6 is the touch sensitive apparatus of embodiment 3, wherein an optical density of the border area is at least 2.

Embodiment 7 is the touch sensitive apparatus of embodiment 3, wherein an optical density of the border area is at least 3.

Embodiment 8 is the touch sensitive apparatus of embodiment 1, wherein the first and second electrodes in the pluralities of the first and second electrodes are optically transparent.

Embodiment 9 is the touch sensitive apparatus of embodiment 1, wherein the first and second electrodes in the pluralities of the first and second electrodes comprise an optically transparent metal oxide.

Embodiment 10 is the touch sensitive apparatus of embodiment 1, wherein the optically transparent metal oxide comprises at least one of indium tin oxide (ITO), zinc oxide (ZnO), aluminum zinc oxide (AZO), indium zinc oxide (IZO), and tin antimony oxide (TAO).

Embodiment 11 is the touch sensitive apparatus of embodiment 1, wherein each first electrode comprises an electrically conductive optically transparent mesh comprising a plurality of vertices connecting a plurality of electrically conductive edges.

Embodiment 12 is the touch sensitive apparatus of embodiment 11, wherein each edge in the plurality of electrically conductive edges is optically opaque.

Embodiment 13 is the touch sensitive apparatus of embodiment 11, wherein at least some of the edges in the plurality of electrically conductive edges are straight.

Embodiment 14 is the touch sensitive apparatus of embodiment 11, wherein at least some of the edges in the plurality of electrically conductive edges are curved.

Embodiment 15 is the touch sensitive apparatus of embodiment 11, wherein each edge in the plurality of electrically conductive edges comprises at least one of copper, silver, or gold.

Embodiment 16 is the touch sensitive apparatus of embodiment 11, wherein each first electrode has a first maximum width, and each edge in the plurality of electrically conductive edges has a second maximum width smaller than the first maximum width by at least a factor of 10.

Embodiment 17 is the touch sensitive apparatus of embodiment 11, wherein each first electrode has a first maximum width, and each edge in the plurality of electrically conductive edges has a second maximum width smaller than the first maximum width by at least a factor of 100.

Embodiment 18 is the touch sensitive apparatus of embodiment 11, wherein an optical transmission of each first electrode is greater than about 95%.

Embodiment 19 is the touch sensitive apparatus of embodiment 11, wherein an optical transmission of each first electrode is greater than about 98%.

Embodiment 20 is the touch sensitive apparatus of embodiment 11, wherein each first electrode has an open area fraction of at least 95%.

Embodiment 21 is the touch sensitive apparatus of embodiment 11, wherein each first electrode has an open area fraction of at least 98%.

Embodiment 22 is the touch sensitive apparatus of embodiment 11, wherein each edge in the plurality of electrically conductive edges has a maximum width of less than 10 microns.

Embodiment 23 is the touch sensitive apparatus of embodiment 11, wherein each edge in the plurality of electrically conductive edges has a maximum width of less than 5 microns.

Embodiment 24 is the touch sensitive apparatus of embodiment 11, wherein each edge in the plurality of electrically conductive edges has a substantially constant width along an entire length of the edge.

Embodiment 25 is the touch sensitive apparatus of embodiment 11, wherein each edge in the plurality of electrically conductive edges has a varying width along a length of the edge.

Embodiment 26 is the touch sensitive apparatus of embodiment 1, wherein each second electrode comprises an electrically conductive optically transparent mesh comprising a plurality of vertices connecting a plurality of electrically conductive edges.

Embodiment 27 is the touch sensitive apparatus of embodiment 1, wherein each first and second electrode comprises a zigzag pattern.

Embodiment 28 is the touch sensitive apparatus of embodiment 1, wherein each first and second electrode comprises a plurality of substantially parallel electrically conductive electrode lines electrically connected to one another at opposite longitudinal ends of the first electrode.

Embodiment 29 is the touch sensitive apparatus of embodiment 1, wherein each first, but not second, electrode comprises a plurality of substantially parallel electrically conductive electrode lines electrically connected to one another at opposite longitudinal ends of the first electrode.

Embodiment 30 is the touch sensitive apparatus of embodiment 1, wherein each first and second electrode comprises a self-supporting electrically conductive wire.

Embodiment 31 is the touch sensitive apparatus of embodiment 30, wherein the conductive wire is surrounded by an insulative cladding coated on the conductive wire.

Embodiment 32 is the touch sensitive apparatus of embodiment 1, wherein each bus line comprises a self-supporting electrically conductive wire surrounded by an insulative cladding coated on the conductive wire.

Embodiment 33 is the touch sensitive apparatus of embodiment 1, wherein at least one first or second electrode is disposed in the border area.

Embodiment 34 is the touch sensitive apparatus of embodiment 1, wherein the at least one first or second electrode that is disposed in the border area is not electrically connected to the controller.

Embodiment 35 is the touch sensitive apparatus of embodiment 1, wherein at least one first electrode and at least one second electrode are disposed in the border area.

Embodiment 36 is the touch sensitive apparatus of embodiment 35, wherein the at least one first electrode and the at least one second electrode that are disposed in the border area are not electrically connected to the controller.

Embodiment 37 is the touch sensitive apparatus of embodiment 1, wherein the at least one node in the plurality of nodes that is disposed in the border area corresponds to a first electrode and a second electrode traversing each other at the at least one node, at least one of the first and second electrodes not being electrically connected to a bus line in the plurality of electrically conductive bus lines disposed in the border area.

Embodiment 38 is the touch sensitive apparatus of embodiment 1, wherein the touch sensitive viewing area has a first maximum width and the border area has a second maximum width that is smaller than the first maximum width by at least a factor of 10.

Embodiment 39 is the touch sensitive apparatus of embodiment 1, wherein the touch sensitive viewing area has a first maximum width and the border area has a second maximum width that is smaller than the first maximum width by at least a factor of 100.

Embodiment 40 is the touch sensitive apparatus of embodiment 1, wherein the first and second electrodes form a first group of electrodes and a remaining second group of electrodes, wherein the bus lines form a first group of bus lines and a remaining second group of bus lines, the first group of electrodes being routed by the first group of bus lines to a first outer edge of the border area, the second group of electrodes being routed by the second group of bus lines to a different second outer edge of the border area.

Embodiment 41 is the touch sensitive apparatus of embodiment 40, wherein the first outer edge is opposite the second outer edge.

Embodiment 42 is the touch sensitive apparatus of embodiment 1, wherein the first and second electrodes are routed by the bus lines to a same outer edge of the border area.

Embodiment 43 is the touch sensitive apparatus of embodiment 1, wherein the first electrodes are disposed on a first major surface of an optically transparent substrate disposed in the touch sensitive viewing area, and the second electrodes are disposed on an opposite second major surface of the optically transparent substrate in the touch sensitive viewing area.

Embodiment 44 is the touch sensitive apparatus of embodiment 1 being flat.

Embodiment 45 is the touch sensitive apparatus of embodiment 1 being curved.

Embodiment 46 is a display system comprising: a display having a viewing area configured to display information; the touch sensitive apparatus of embodiment 1 disposed on the display, the touch sensitive viewing area being substantially aligned with the viewing area of the display.

Embodiment 47 is a capacitive touch sensitive apparatus, comprising: an optically transparent touch sensitive area; an optically opaque border area surrounding the touch sensitive area; a plurality of spaced apart electrically conductive optically transparent first electrodes disposed in the touch sensitive area and extending along a first direction; a plurality of spaced apart electrically conductive optically transparent second electrodes disposed in the touch sensitive area and extending along a different second direction, the touch sensitive apparatus being configured to detect a location of a touch applied in the touch sensitive area by detecting a change in a coupling capacitance between a first and a second electrode traversing each other near the touch location; and a plurality of electrically conductive bus lines disposed in the border area for electrically coupling the pluralities of the first and second electrodes to a controller, wherein at least one of a first and second electrodes is disposed in the border area.

Embodiment 48 is the touch sensitive apparatus of embodiment 47 comprising an optically opaque layer disposed in the border, but not the touch sensitive, area.

Embodiment 49 is the touch sensitive apparatus of embodiment 48, wherein the optically opaque layer is a printed optically opaque layer.

Embodiment 50 is the touch sensitive apparatus of embodiment 47, wherein an optical density of the border area is at least 2.

Embodiment 51 is the touch sensitive apparatus of embodiment 47, wherein an optical density of the border area is at least 3.

Embodiment 52 is the touch sensitive apparatus of embodiment 47, wherein the first and second electrodes in the pluralities of the first and second electrodes comprise an optically transparent metal oxide.

Embodiment 53 is the touch sensitive apparatus of embodiment 52, wherein the optically transparent metal oxide comprises at least one of indium tin oxide (ITO), zinc oxide (ZnO), aluminum zinc oxide (AZO), indium zinc oxide (IZO), and tin antimony oxide (TAO).

Embodiment 54 is the touch sensitive apparatus of embodiment 47, wherein each first electrode comprises an electrically conductive optically transparent mesh comprising a plurality of vertices connecting a plurality of electrically conductive edges.

Embodiment 55 is the touch sensitive apparatus of embodiment 54, wherein each edge in the plurality of electrically conductive edges is optically opaque.

Embodiment 56 is the touch sensitive apparatus of embodiment 54, wherein at least some of the edges in the plurality of electrically conductive edges are straight.

Embodiment 57 is the touch sensitive apparatus of embodiment 54, wherein at least some of the edges in the plurality of electrically conductive edges are curved.

Embodiment 58 is the touch sensitive apparatus of embodiment 54, wherein each edge in the plurality of electrically conductive edges comprises at least one of copper, silver, or gold.

Embodiment 59 is the touch sensitive apparatus of embodiment 54, wherein each first electrode has a first maximum width, and each edge in the plurality of electrically conductive edges has a second maximum width smaller than the first maximum width by at least a factor of 10.

Embodiment 60 is the touch sensitive apparatus of embodiment 54, wherein each first electrode has a first maximum width, and each edge in the plurality of electrically conductive edges has a second maximum width smaller than the first maximum width by at least a factor of 100.

Embodiment 61 is the touch sensitive apparatus of embodiment 54, wherein an optical transmission of each first electrode is greater than about 95%.

Embodiment 62 is the touch sensitive apparatus of embodiment 54, wherein an optical transmission of each first electrode is greater than about 98%.

Embodiment 63 is the touch sensitive apparatus of embodiment 54, wherein each first electrode has an open area fraction of at least 95%.

Embodiment 64 is the touch sensitive apparatus of embodiment 54, wherein each first electrode has an open area fraction of at least 98%.

Embodiment 65 is the touch sensitive apparatus of embodiment 54, wherein each edge in the plurality of electrically conductive edges has a maximum width of less than 10 microns.

Embodiment 66 is the touch sensitive apparatus of embodiment 54, wherein each edge in the plurality of electrically conductive edges has a maximum width of less than 5 microns.

Embodiment 67 is the touch sensitive apparatus of embodiment 54, wherein each edge in the plurality of electrically conductive edges has a substantially constant width along an entire length of the edge.

Embodiment 68 is the touch sensitive apparatus of embodiment 54, wherein each edge in the plurality of electrically conductive edges has a varying width along a length of the edge.

Embodiment 69 is the touch sensitive apparatus of embodiment 47, wherein each second electrode comprises an electrically conductive optically transparent mesh comprising a plurality of vertices connecting a plurality of electrically conductive edges.

Embodiment 70 is the touch sensitive apparatus of embodiment 47, wherein each first and second electrode comprises a zigzag pattern.

Embodiment 71 is the touch sensitive apparatus of embodiment 47, wherein each first and second electrode comprises a plurality of substantially parallel electrically conductive electrode lines electrically connected to one another at opposite longitudinal ends of the first electrode.

Embodiment 72 is the touch sensitive apparatus of embodiment 47, wherein each first, but not second, electrode comprises a plurality of substantially parallel electrically conductive electrode lines electrically connected to one another at opposite longitudinal ends of the first electrode.

Embodiment 73 is the touch sensitive apparatus of embodiment 47, wherein each first and second electrode comprises a self-supporting electrically conductive wire.

Embodiment 74 is the touch sensitive apparatus of embodiment 73, wherein the conductive wire is surrounded by an insulative cladding coated on the conductive wire.

Embodiment 75 is the touch sensitive apparatus of embodiment 47, wherein each bus line comprises a self-supporting electrically conductive wire surrounded by an insulative cladding coated on the conductive wire.

Embodiment 76 is the touch sensitive apparatus of embodiment 47, wherein the at least one first or second electrode that is disposed in the border area is not electrically connected to the controller.

Embodiment 77 is the touch sensitive apparatus of embodiment 47, wherein at least one first electrode and at least one second electrode are disposed in the border area.

Embodiment 78 is the touch sensitive apparatus of embodiment 77, wherein the at least one first electrode and the at least one second electrode that are disposed in the border area are not electrically connected to the controller.

Embodiment 79 is the touch sensitive apparatus of embodiment 47, wherein the touch sensitive area has a first maximum width and the border area has a second maximum width that is smaller than the first maximum width by at least a factor of 10.

Embodiment 80 is the touch sensitive apparatus of embodiment 47, wherein the touch sensitive area has a first maximum width and the border area has a second maximum width that is smaller than the first maximum width by at least a factor of 100.

Embodiment 81 is the touch sensitive apparatus of embodiment 47, wherein the first and second electrodes form a first group of electrodes and a remaining second group of electrodes, wherein the bus lines form a first group of bus lines and a remaining second group of bus lines, the first group of electrodes being routed by the first group of bus lines to a first outer edge of the border area, the second group of electrodes being routed by the second group of bus lines to a different second outer edge of the border area.

Embodiment 82 is the touch sensitive apparatus of embodiment 81, wherein the first outer edge is opposite the second outer edge.

Embodiment 83 is the touch sensitive apparatus of embodiment 47, wherein the first and second electrodes are routed by the bus lines to a same outer edge of the border area.

Embodiment 84 is the touch sensitive apparatus of embodiment 47, wherein the first electrodes are disposed on a first major surface of an optically transparent substrate disposed in the touch sensitive area, and the second electrodes are disposed on an opposite second major surface of the optically transparent substrate in the touch sensitive area.

Embodiment 85 is the touch sensitive apparatus of embodiment 47 being flat.

Embodiment 86 is the touch sensitive apparatus of embodiment 47 being curved.

Embodiment 87 is a display system comprising: a display having a viewing area configured to display information; the touch sensitive apparatus of embodiment 47 disposed on the display, the touch sensitive area being substantially aligned with the viewing area of the display.

Embodiment 88 is the touch sensitive apparatus of embodiment 47, wherein each first electrode traverses each second electrode at a node and each second electrode traverses each first electrode at a node, the touch sensitive apparatus configured to detect a location of a touch applied proximate a node by detecting a change in a coupling capacitance between the corresponding first and second electrodes traversing each other at the node.

Embodiment 89 is the touch sensitive apparatus of embodiment 47, wherein at least one node is disposed in the border area.

Embodiment 90 is the touch sensitive apparatus of embodiment 47, wherein a plurality of nodes are disposed in the border area.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A capacitive touch sensitive apparatus, comprising:
   a touch sensitive viewing area;
   a border area surrounding the touch sensitive viewing area;
   a plurality of spaced apart electrically conductive first electrodes disposed in the touch sensitive viewing area and extending along a first direction;
   a plurality of spaced apart electrically conductive second electrodes disposed in the touch sensitive viewing area and extending along a different second direction;
   a plurality of nodes, each node defined by corresponding first and second electrodes traversing each other at the node, each first electrode traversing at least one second electrode, each second electrode traversing at least one first electrode, the touch sensitive apparatus being configured to detect a location of a touch applied proximate a node by detecting a change in a coupling capacitance between the corresponding first and second electrodes traversing each other at the node; and a plurality of electrically conductive bus lines disposed in the border area for electrically coupling the pluralities of the first and second electrodes to a controller, wherein at least one node in the plurality of nodes is disposed in the border area, wherein the at least one node in the plurality of nodes that is disposed in the border area corresponds to a first electrode and a second electrode traversing each other at the at least one node, at least one of the first and second electrodes not electrically connected to a bus line in the plurality of electrically conductive bus lines disposed in the border area.

2. The touch sensitive apparatus of claim 1, wherein the touch sensitive viewing area is optically transparent and the border area is optically opaque.

3. A capacitive touch sensitive apparatus, comprising:
an optically transparent touch sensitive area;
an optically opaque border area surrounding the touch sensitive area;
a plurality of spaced apart electrically conductive optically transparent first electrodes disposed in the touch sensitive area and extending along a first direction;
a plurality of spaced apart electrically conductive optically transparent second electrodes disposed in the touch sensitive area and extending along a different second direction, the touch sensitive apparatus being configured to detect a location of a touch applied in the touch sensitive area by detecting a change in a coupling capacitance between a first and a second electrode traversing each other near the touch location; and
plurality of electrically conductive bus lines disposed in the border area for electrically coupling the pluralities of the first and second electrodes to a controller, wherein at least one of a first and second electrodes is disposed in the border area and is not electrically connected to the controller.

4. The touch sensitive apparatus of claim 3, wherein at least one first electrode and at least one second electrode are disposed in the border area, and wherein the at least one first electrode and the at least one second electrode are not electrically connected to the controller.

* * * * *